United States Patent [19]

Tayloe

[11] Patent Number: 5,678,174
[45] Date of Patent: Oct. 14, 1997

[54] COMMUNICATION SYSTEM WHICH PREDICTS GOOD OPPORTUNITIES FOR COMMUNICATION

[75] Inventor: Daniel Richard Tayloe, Phoenix, Ariz.

[73] Assignee: Motorola, Schaumburg, Ill.

[21] Appl. No.: 427,390

[22] Filed: Apr. 24, 1995

[51] Int. Cl.$^6$ ........................................... H04B 7/185
[52] U.S. Cl. ..................... 455/13.1; 455/54.1; 455/33.1; 342/357
[58] Field of Search ............... 455/13.1, 13.2, 455/12.1, 33.1, 54.1, 158.8, 158.5, 38.4, 171; 342/357

[56] References Cited

U.S. PATENT DOCUMENTS

| | | | |
|---|---|---|---|
| 5,444,450 | 8/1995 | Olds et al. | 342/357 |
| 5,500,648 | 3/1996 | Maine et al. | 342/357 |
| 5,528,247 | 6/1996 | Nonami | 342/357 |
| 5,537,679 | 7/1996 | Crosbie et al. | 455/132 |
| 5,537,681 | 7/1996 | Redden et al. | 455/33.1 |
| 5,555,444 | 9/1996 | Diekelman et al. | 455/12.1 |

OTHER PUBLICATIONS

Steve Mortiz, Handoff Design Considerations for the IRIDIUM System, Scientific and Technical Information Center of MPT of China, pp. 1–7 Nov. 1991.

*Primary Examiner*—Reinhard J. Eisenzopf
*Assistant Examiner*—Darnell R. Armstrong
*Attorney, Agent, or Firm*—Gregory J. Gorrie

[57] ABSTRACT

A communication network (10) includes a number of satellites (12) traveling in low earth orbits (14). The satellites (12) broadcast data which identify particular cells (34) within which communication may take place and geographic locations for the cells (34). A radio unit (26) located near the earth's surface receives these broadcast data and calculates a satellite position relative to the radio unit (26). Based upon this position, the radio unit (26) predicts when target satellites (12) will reach their maximum elevation angles relative to the radio unit (26) and the future times at which these maximum elevation angles will be reached. These predictions are then presented to a user of the radio unit (26).

16 Claims, 6 Drawing Sheets

COMMUNICATION SYSTEM WHICH PREDICTS GOOD OPPORTUNITIES FOR COMMUNICATION

FIELD OF THE INVENTION

The present invention relates generally to the field of radio communications. More specifically, the present invention relates to a communication system in which a radio unit can provide information to a user to inform the user of predicted good opportunities for successful communications.

BACKGROUND OF THE INVENTION

Radio communication systems often attempt to carry the greatest possible amount of call traffic. Modern communication systems often utilize higher frequency ranges where wider frequency bands are available for use because wider frequency bands accommodate a greater amount of call traffic. In addition, such communication systems often implement communications using cellular techniques which keep transmission power levels at a minimum so that communication signals cause interference within only a small area around where the signals are transmitted. Cellular techniques allow the frequency spectrum to be reused outside of the interference range, and lower transmission power levels allow greater amounts of reuse and greater amounts of call traffic. A consequence of using high frequency ranges and of using low power levels is that transmitted signals may be easily blocked by obstructions located between a transmitter and receiver. When the signals are blocked, no communication between the transmitter and receiver can take place.

In a cellular system wherein communication occurs between an earth-bound base unit and an earth-bound mobile radio unit, the blocked signal problem is of relatively minor consequence. Typically, if a mobile radio unit can communicate for even an instant with a base station from a given location, the radio unit will be able to communicate indefinitely from that given location. Moreover, since base stations and mobile units typically reside within a few miles of one another, relatively minor amounts of movement by the mobile unit often cure a blocked signal problem. In short, if a mobile unit cannot communicate with its system, it typically needs only to move a short distance to be able to communicate, and if it stays at the location where it can communicate it is likely to be able to continue communicating indefinitely.

The blocked signal problem is more serious in a cellular system wherein communication occurs between a space-based satellite base station and an earth-bound mobile radio unit. The space-based satellite typically resides in a low-earth orbit so that low power communication signals need not travel long distances between the satellite and the radio unit and so that the satellite's coverage range occupies as small an area as possible to increase frequency reuse as much as possible.

One consequence of the low-earth orbit is that the satellites continually move or travel in their orbits, often at a great speed. Thus, in situations where communications may occur with the radio unit positioned at a given location, such communication may not continue indefinitely even when the radio unit remains stationary because the satellite is moving.

Another consequence of space-based satellite base stations is that they are located a considerably longer distance away, typically hundreds of miles, from their radio units than earth-bound base stations are from their radio units. Likewise, signal-blocking obstructions, such as mountain ranges, hills, urban areas, and the like, may be located farther away, and at any given moment a radio unit may need to travel an impractical distance to escape the influence of an obstruction.

SUMMARY OF THE INVENTION

Accordingly, it is an advantage of the present invention that an improved method and apparatus for predicting conditions under which a mobile radio unit will have a good chance of engaging in successful communications is provided.

Another advantage is that information is provided to a user of a mobile radio unit to allow the user to deal with the blocked signal problem.

Another advantage is that the user is informed of conditions under which successful communications are more likely in a communication system using space-based satellite base stations and earth-bound mobile radio units.

The above and other advantages of the present invention are carried out in one form by a method for operating a radio unit that communicates with a constellation of satellites traveling in moving-earth orbits. The method calls for receiving a signal transmitted from one of the satellites. A relative position between the radio unit and the satellite is determined in response to the signal. In response to the relative position, a future time when successful communication may take place between the radio unit and one of the satellites is determined. The future time is presented to a user of the radio unit.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
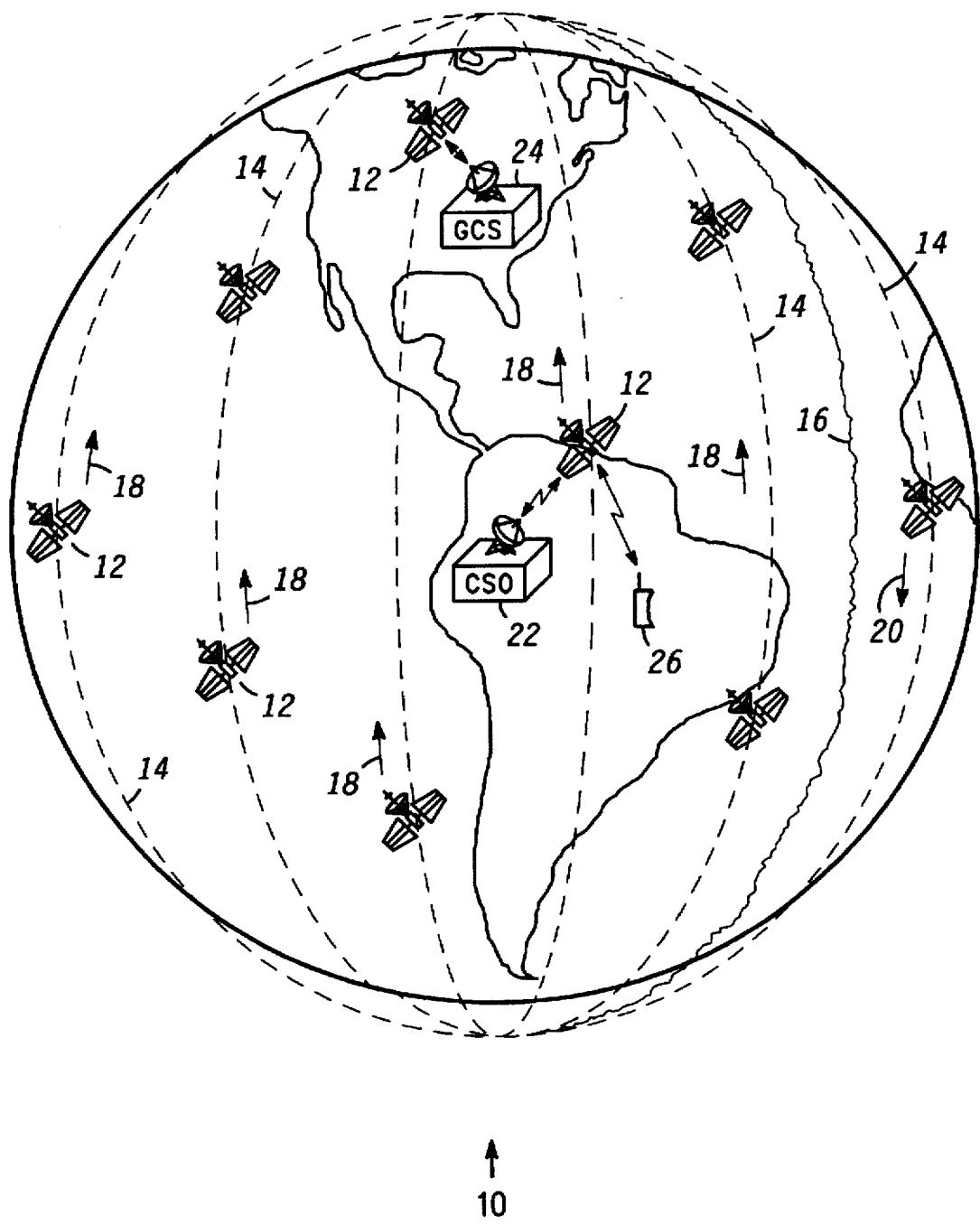
FIG. 1 shows a diagram of an environment in which the present invention may be practiced.

FIG. 1 illustrates a satellite-based communication network 10. Network 10 is dispersed over the earth through the use of a constellation of above-the-earth base stations, such as orbiting satellites 12. In the currently preferred embodiment, satellites 12 occupy polar, low-earth orbits 14. In particular, the preferred embodiment of network 10 uses six polar orbital planes, with each orbit holding eleven satellites 12 for a total of sixty-six satellites 12. For clarity, FIG. 1 illustrates only a few of these satellites 12.

Orbital planes 14 and satellites 12 are distributed around the earth. In the example depicted for the currently preferred embodiment, each orbit 14 encircles the earth at an altitude of around 765 km. Due to the relatively low orbits of satellites 12, substantially line-of-sight electromagnetic transmissions from any one satellite cover a relatively small area of the earth at any point in time. For example, when satellites 12 occupy orbits at around 765 km above the earth, such transmissions may cover "footprint" areas around 5000 km in diameter.

Due to the low-earth character of orbits 14, satellites 12 travel with respect to the earth at around 25,000 km/hr. This allows a satellite 12 to be within view of a point on the surface of the earth for a maximum period of around nine to ten minutes.

Satellites 12 maintain a relatively constant distance among one another, except for two modes of movement. In a first mode of movement, satellites 12 converge toward one another while approaching the polar regions and diverge away from one another while approaching the equator.

A second mode of movement occurs at a constellation seam 16. Seam 16 divides the earth into two hemispheres with respect to the constellation of satellites 12. In one hemisphere, satellites 12 move from south to north, as indicated by direction arrows 18 in FIG. 1. In the other hemisphere, satellites 12 move from north to south, as indicated by direction arrow 20 in FIG. 1. Seam 16 resides on opposing sides of the earth between a south-north orbit 14 and a north-south orbit 14. Satellites 12 adjacent to and on opposing sides of seam 16 travel in opposing directions and approach and pass each other at a rate of around 50,000 km/hr.

Satellites 12 communicate with devices on the ground through many central switching offices (CSOs) 22, of which FIG. 1 shows only one, a few ground control stations (GCSs) 24, of which FIG. 1 shows only one, and any number of radio units 26, of which one is shown in FIG. 1. CSOs 22, GCSs 24, and radio units 26 may be located anywhere on the surface of the earth or in the atmosphere above the earth.

CSOs 22 serve a different function from that of GCSs 24. GCSs 24 preferably perform telemetry, tracking, and control (TT&C) functions for the constellation of satellites 12. Preferably, CSOs 22 operate as communication nodes in network 10. Diverse terrestrial-based communications systems, such as the worldwide public switched telecommunications network (not shown), may access network 10 through CSOs 22. Due to the configuration of the constellation of satellites 12, at least one of satellites 12 is within view of each point on the surface of the earth at all times. Accordingly, network 10 may establish a communication circuit through the constellation of satellites 12 between any two radio units 26, between any radio unit 26 and a CSO 22, or between any two CSOs 22.

Figure 2:
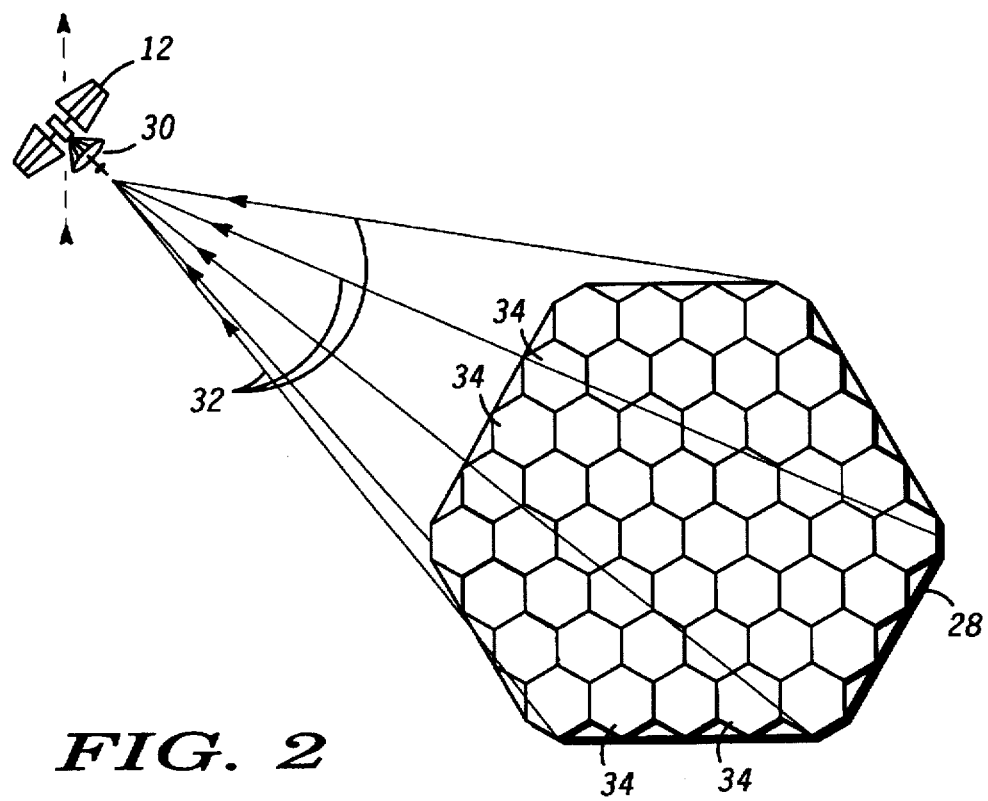
FIG. 2 shows a schematic diagram of a pattern of cells formed on the surface of the earth by an antenna of a satellite.

FIG. 2 schematically shows a cellular footprint pattern 28 formed on the surface of the earth by a single satellite 12. Each satellite 12 includes a multibeam, directional antenna 30. Each antenna 30 projects numerous discrete antenna beams or patterns 32 toward the earth's surface at numerous diverse angles away from its satellite 12. FIG. 2 shows a diagram of a resulting pattern of cells 34 that beams 32 form on the surface of the earth. Each beam 32 is associated with a cell 34 in a one-to-one correspondence, and each cell 34 represents the area defined by the intersection of a beam 32 with the surface of the earth. Each cell 34 within footprint 28 occupies a unique position within footprint 28. These positions are distinguished from one another through the use of a cell ID, listed as 1 through 48 in FIG. 2. In the preferred embodiment of the present invention, all satellites 12 are configured substantially as depicted in FIG. 2. Thus, other satellites 12 (not shown) form other similar footprints (not shown). Desirably, a continuous blanket of cells 34 substantially covers the entire surface of the earth.

For convenience, the schematic diagram of FIG. 2 illustrates cells 34 and footprint 28 as being discrete, generally hexagonal shapes without overlap or gaps. However, those skilled in the art will understand that in actual practice equal strength lines projected by beams 32 from antennas 30 of satellites 12 may actually have a shape far different than a hexagonal shape, that antenna side lobes may distort the pattern, that some cells 34 may cover larger areas than other cells 34, and that some overlap between adjacent cells may be expected.

Network 10 (see FIG. 1) communicates through satellites 12 with radio units 26 (see FIG. 1) using the electromagnetic spectrum. This communication takes place through antenna 30 and beams 32. Those skilled in the art will appreciate the multiple beams 32 formed by antenna 30 define a geometry and do not imply a particular direction of communication. In other words, communications may be transmitted and/or received through the beams 32 projected by antenna 30 toward the earth's surface.

In the preferred embodiment of the present invention, a beam broadcast signal is continually or repeatedly transmitted from satellite 12 through each beam 32. Each beam's broadcast signal has different parameters than other beams' broadcast signals, and each beam's broadcast signal carries information identifying the satellite 12 broadcasting the signal, the cell 34 and/or the beam 32 with which the broadcast signal is associated, and a geographic location where the beam 32 intersects the surface of the earth at approximately the moment of transmission. Desirably, this geographic location is positioned approximately at the center of the corresponding cell 34. The identities and frequency, timing, and/or coding parameters of these broadcast signals are known to radio units 26.

While FIGS. 1-2 and the above-presented discussion describe a preferred orbital geometry for network 10, those skilled in the art will appreciate that the base stations which satellites 12 provide need not be positioned precisely as described herein. For example, in some embodiments, the present invention may be practiced using base stations located on the surface of the earth or in orbits other than those described herein. Likewise, the precise number of base stations may vary from network to network.

Figure 3:
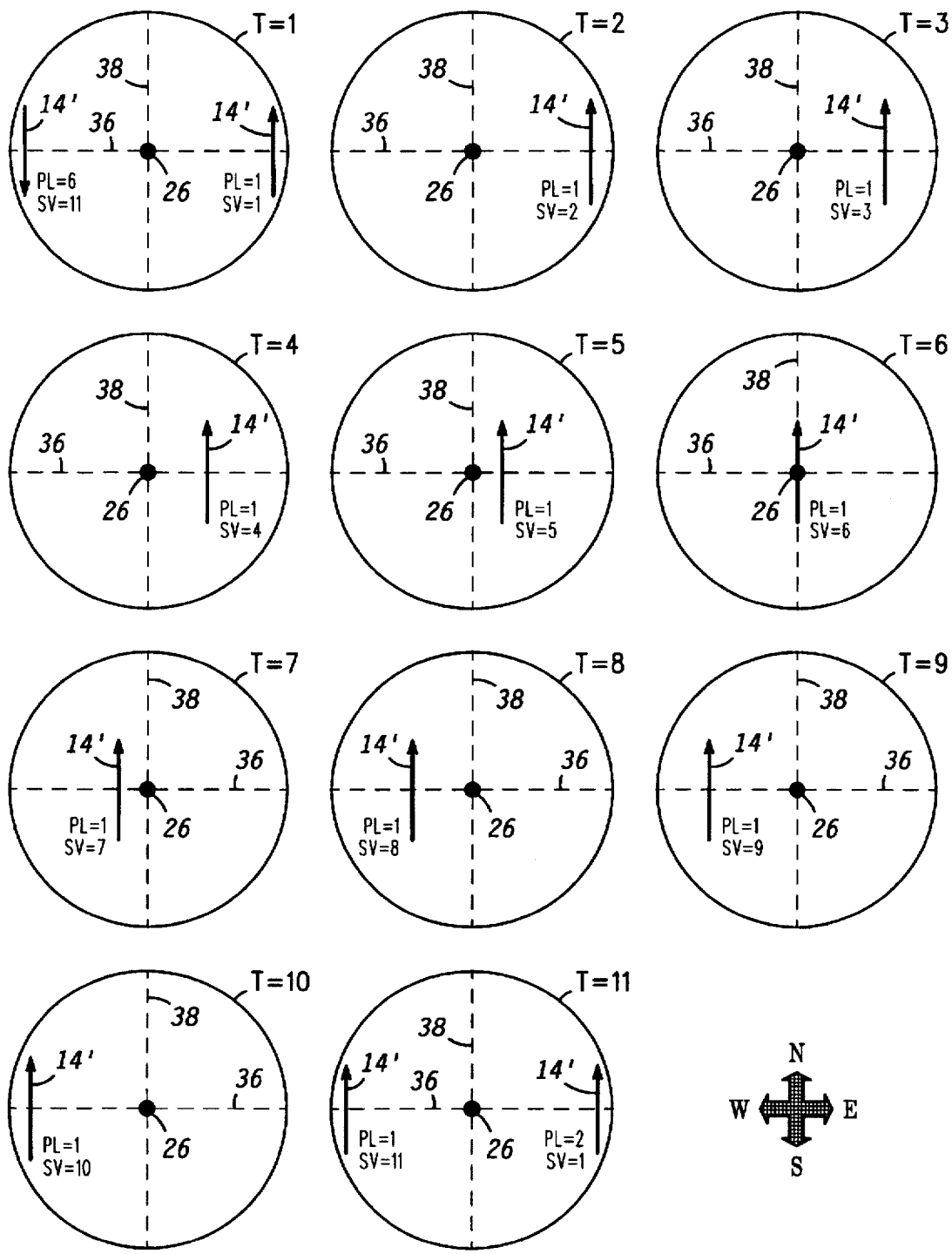
FIG. 3 shows a timing diagram of an example unobstructed situation with eleven time periods in which relative satellite availability, position, and motion are depicted.
Figure 4:
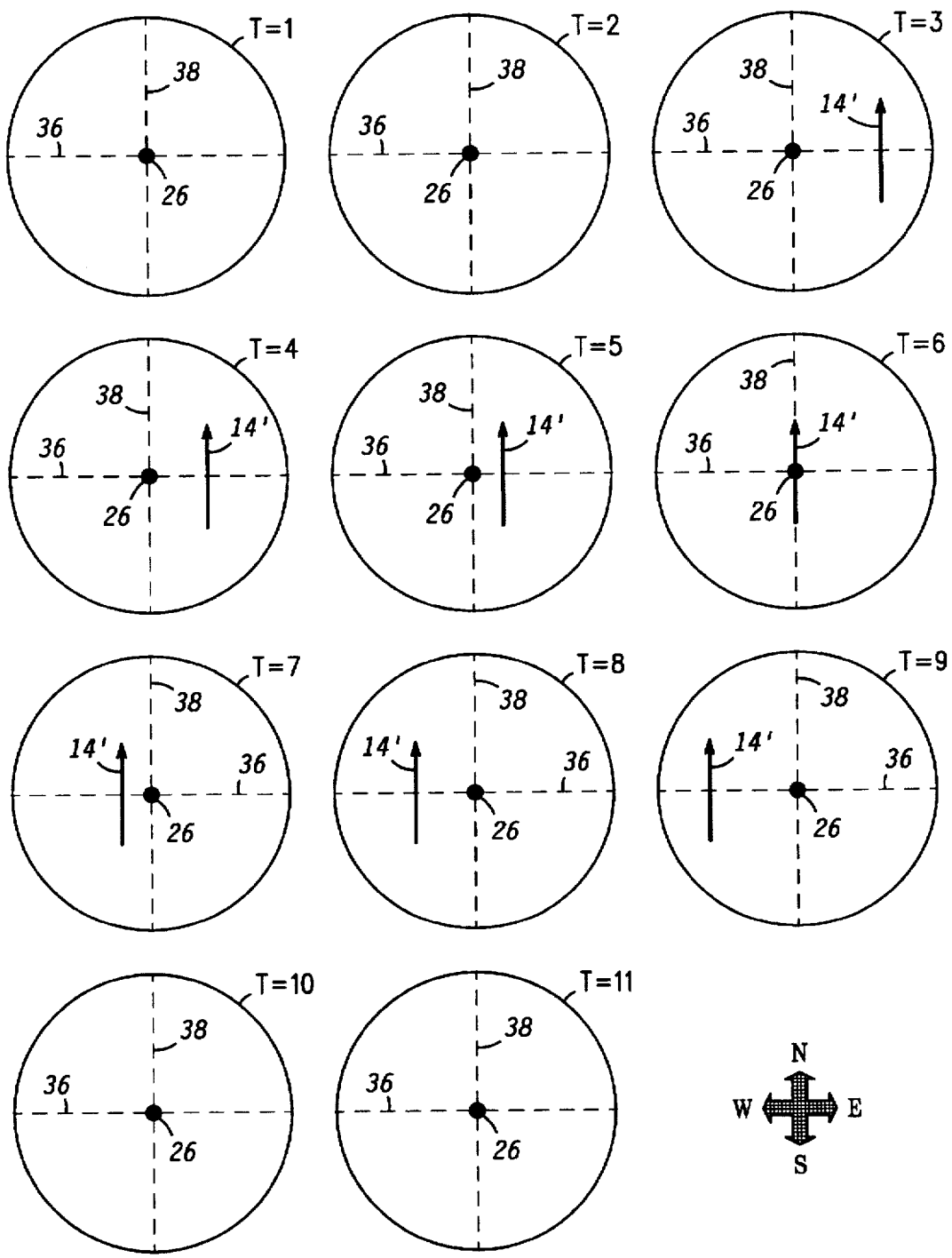
FIG. 4 shows a timing diagram of an example obstructed situation with the same eleven time periods that are depicted in FIG. 3.

FIGS. 3 and 4 depict the movement of satellites 12 overhead from the perspective of a radio unit 26 near the surface of the earth. FIG. 3 shows a timing diagram of an example "unobstructed" situation, and FIG. 4 shows a timing diagram of an example "obstructed" situation.

Referring to FIGS. 3 and 4, each situation is depicted throughout eleven sequential time periods, labeled T=1 through T=11. These eleven time periods roughly chronicle the duration for which a single orbital plane 14 (see FIG. 1) will be in view of a radio unit 26, which is around two hours in the preferred embodiment. For each time period, FIGS. 3 and 4 show 360 degrees of horizon surrounding a radio unit 26. In addition, for each time period FIGS. 3 and 4 show one or more tracks 14'. The length of tracks 14' corresponds to the duration for which radio unit 26 may communicate with a satellite 12, and the position and direction of tracks 14' correspond to the relative position between radio unit 26 and a satellite 12 throughout this duration as the satellite 12 travels in its orbital plane 14 (see FIGS. 1–2). When a satellite 14 travels directly overhead, as depicted during time period T=6, the satellite 12 may be in view for around 10 minutes. During other time periods the satellite 12 may be in view for shorter durations.

FIG. 3 depicts radio unit 26 directly underneath seam 16 (see FIG. 1) at time period T=1. A first satellite vehicle 14 (SV=1) travels in a south-north direction in a first orbital plane (PL=1), and a second satellite (SV=11) travels in a north-south direction in a sixth orbital plane (PL=6).

At time period T=1, the first satellite (SV=1) arcs across a small portion of the sky far to the east of radio unit 26, never achieving a high elevation angle relative to radio unit 26. However, the highest elevation angle achieved by this first satellite (SV=1) during time period T=1 occurs when the first satellite (SV=1) crosses an imaginary line 36 extending in an east-west direction at radio unit 26. Not necessarily at the same instant, but nevertheless within time period T=1, the second satellite arcs across a small portion of the sky far to the west of radio unit 26, never achieving a high elevation angle.

Neither of the satellites (SV=11 or SV=1) are within view for more than a couple of minutes throughout time period T=1. Consequently, communication taking place between radio unit 26 and either satellite might last for only a short duration before the satellite exits over the horizon.

The obstructed situation depicted in FIG. 4, is identical to the unobstructed situation depicted in FIG. 3, except for the inclusion of an obstruction (not shown), such as a mountain range, urban area, or the like. The obstruction looms south of radio unit 26, extending toward the east and west. As indicated by an absence of tracks 14' at time period T=1 in FIG. 4, no communication can take place due to the signal blockage caused by the obstruction and the low elevation angles of the satellites.

For the situations depicted in FIGS. 3 and 4, radio unit 26 remains stationary through time periods T=1 through T=11. Time period T=2 immediately follows time period T=1, time period T=3 immediately follows time period T=2, and so on. Thus, as illustrated at time period T=2 in FIG. 3, another satellite (SV=2) traveling in orbital plane (PL=1) appears over the horizon soon after the departure of the first satellite (SV=1).

Due to the rotation of the earth within the constellation of satellites 12, the orbital plane (PL=1) is now a little closer to radio unit 14. Consequently, this next satellite (SV=2) remains in view slightly longer than did the previous satellite (SV=1). However, the current satellite (SV=2) still fails to achieve a very high elevation angle, with its highest elevation angle being achieved at imaginary line 36. As illustrated in FIG. 4, the obstruction still blocks communications.

During time periods T=3 through T=6, tracks 14' for subsequent satellites 12 move westward until, as shown at time period T=6, a track 14' is directly overhead radio unit 26. Throughout time periods T=3 through T=6, the satellites achieve higher elevation angles and remain in view for longer periods of time. As shown in FIG. 4, the obstruction fails to completely block signals, with greater periods of unblocked communication becoming available as tracks 14' approach an imaginary line 38, which extends in an north-south direction at radio unit 26. The maximum elevation angle of any satellite is achieved during time period T=6 when a satellite (SV=6) travels directly overhead, along imaginary line 38.

During time periods T=7 through T=11, the satellites traveling in this orbital plane (PL=1) traverse tracks 14' which fall progressively further west of radio unit 26. Reduced maximum elevation angles are achieved during each time period, and the satellites are in view for progressively shorter durations. As illustrated in time periods T=10 and T=11 in FIG. 4, the obstruction will eventually block all communications.

FIG. 4 illustrates the nature of the communication service available to a user of radio unit 26 in the vicinity of an obstruction. Even if a radio unit 26 remains stationary, the service alternates between periods of available service and periods of no service available. The durations for these service available and service not available periods may be difficult for a user of radio unit 26 to predict.

Sometimes service is available for significant periods of time with relatively short non-service interruptions, such as occurs during time periods T=5 through T=7. Communications are most likely to be delivered successfully during these time periods. At other times, service is generally unavailable, but this unavailability is interrupted by short periods of availability, such as occurs during time periods T=1 through T=3 and T=9 through T=11. Communications are less likely to be delivered successfully during these time periods.

Accordingly, network 10 (see FIG. 1), including radio unit 26 of network 10, is configured to predict when successful communications are likely and to present the prediction to a user of radio unit 26. The user can then plan his or her schedule to complement the availability of communication services through network 10.

In particular, radio unit 26 predicts one or more future times when communication services are the most likely to be available. These future times are predicted by calculating a parameter which characterizes the likelihood of successful communications between a radio unit 26 and a satellite 12. In the preferred embodiment, this parameter is the elevation angles for satellites 12 relative to the current position for radio unit 26.

As illustrated in FIG. 4, communication is more likely when a satellite 12 reaches its maximum elevation angle relative to radio unit 26 because obstructions are less likely to block transmitted signals. In the short term, the maximum elevation angle for a track 14' is the most likely point for accommodating some period of communication services through a particular satellite 12. This short term maximum elevation angle is achieved when the satellite's track 14' crosses imaginary line 36. In the long term, the absolute maximum elevation angle achieved during T=6 is most likely to accommodate the longest period of communication service. This long term maximum elevation angle is achieved when the track 14' for some satellite 12 crosses imaginary line 38.

Figure 5:
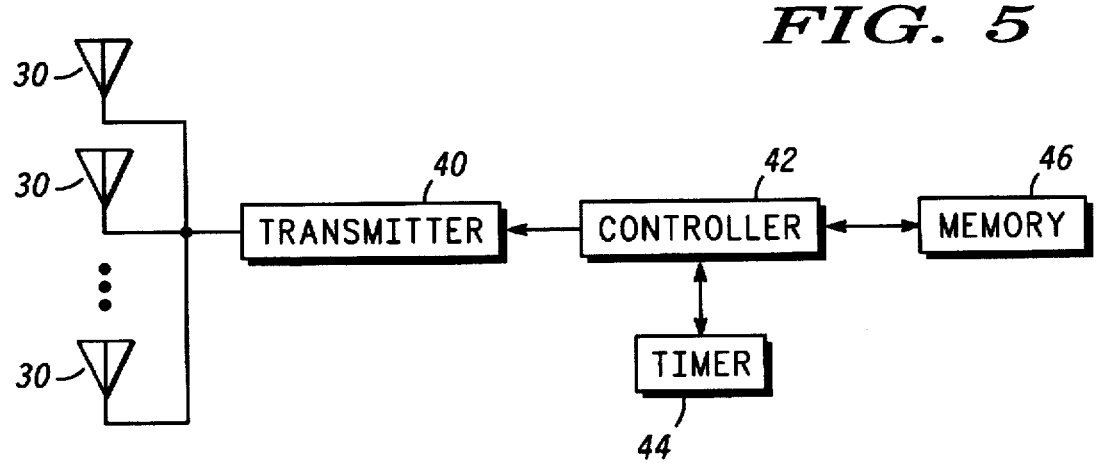
FIG. 5 shows a block diagram of a satellite base station.
Figure 6:
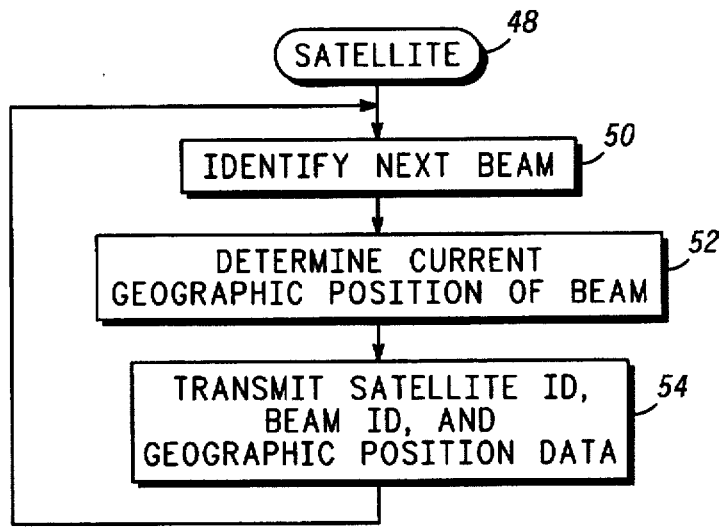
FIG. 6 shows a flow chart of a satellite process performed by the satellite base station.

FIGS. 5–9 illustrate the preferred features of network 10 which allow radio unit 26 to predict future times when communications are likely to be successful. FIG. 5 shows a block diagram of hardware included on board a satellite base station 12, and FIG. 6 shows a flow chart of a satellite process performed by the satellite 12. Desirably, all satellites 12 include substantially the same hardware and perform substantially the same process.

Referring to FIG. 5, directional multibeam antenna 30 couples to an RF output of a transmitter 40. A controller 42 couples to transmitter 40, a timer 44, and a memory 46. Controller 42 may be implemented using one or more microprocessor or other programmable components. Memory 46 stores instruction data which are executed by controller 42 to perform the satellite process illustrated in FIG. 6. In addition, memory 46 stores other variables, tables, databases, and the like, which controller 42 uses in performing the satellite process. Timer 44 is used by controller 42 in a conventional manner as an aid in tracking the passage of time. Controller 42, under the influence of the satellite process, generates data which are transmitted from antenna 30 through beam broadcast signals. Although not shown in FIG. 5, satellite 12 may include additional components, such as additional transmitters, receivers, controllers, batteries, solar panels, and the like.

Referring to FIG. 6, a satellite process 48 performed by satellite 12 performs a task 50. Task 50 identifies a next beam 32 (see FIG. 2) with which the following tasks are concerned. After task 50, a task 52 determines a current geographic position for the beam 32 identified above in task 50. This position is desirably the center of the beam's cell 34, which corresponds to the area defined by the intersection between the beam 32 and the surface of the earth. The position is not limited to being expressed using latitude and longitude data but may be expressed using any convenient coordinate system.

In the preferred embodiment, task 52 obtains the current geographic position by performing a table look-up operation in memory 46 (see FIG. 5) using the current time as an index. During previous processes (not shown) a ground control station 24 (see FIG. 1) calculates these positions for each beam of each satellite and for each period of time, and downloads the data to the corresponding satellites through network 10. The process is repeated from time to time so that satellites 12 continue to have current data.

After task 52, a task 54 transmits the beam broadcast signal modulated to convey the geographic data determined above in task 52, the satellite ID, and beam ID. Of course, other data, such as time of day, may also be included. After task 52, satellite process 48 may perform any number of additional tasks as indicated by ellipsis, then loop back to task 50 to transmit another broadcast beam signal.

Eventually, broadcast beam signals are transmitted in all beams 32 (see FIG. 2) and the process continues to repeat so that each beam broadcast signal tracks geographic positions which change as the satellite 12 travels in its orbit. Although FIG. 6 illustrates a sequential process for clarity, nothing prevents multiple broadcast beam signals from being transmitted simultaneously at a single satellite 12.

Figure 7:
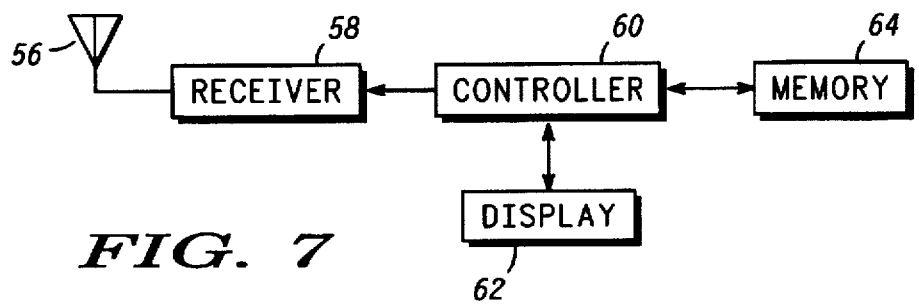
FIG. 7 shows a block diagram of a mobile radio unit.
Figure 8:
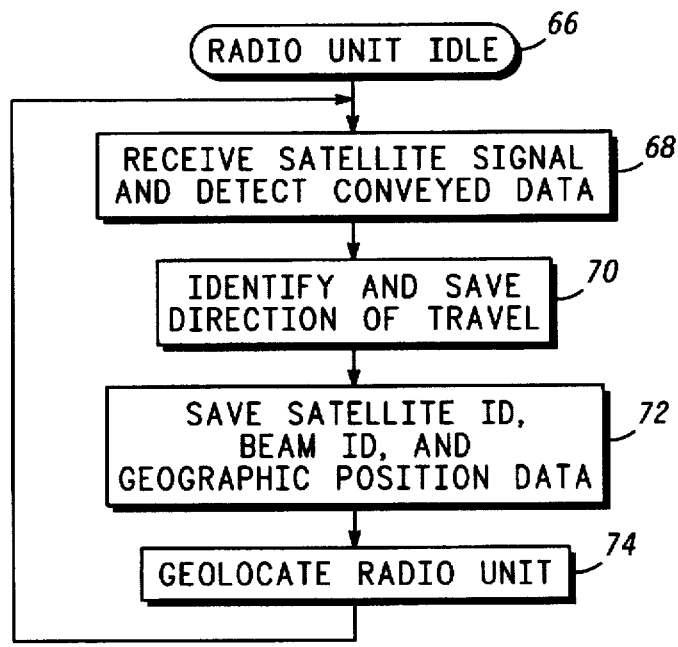
FIG. 8 shows a flow chart of a radio unit idle process performed by the radio unit.
Figure 9:
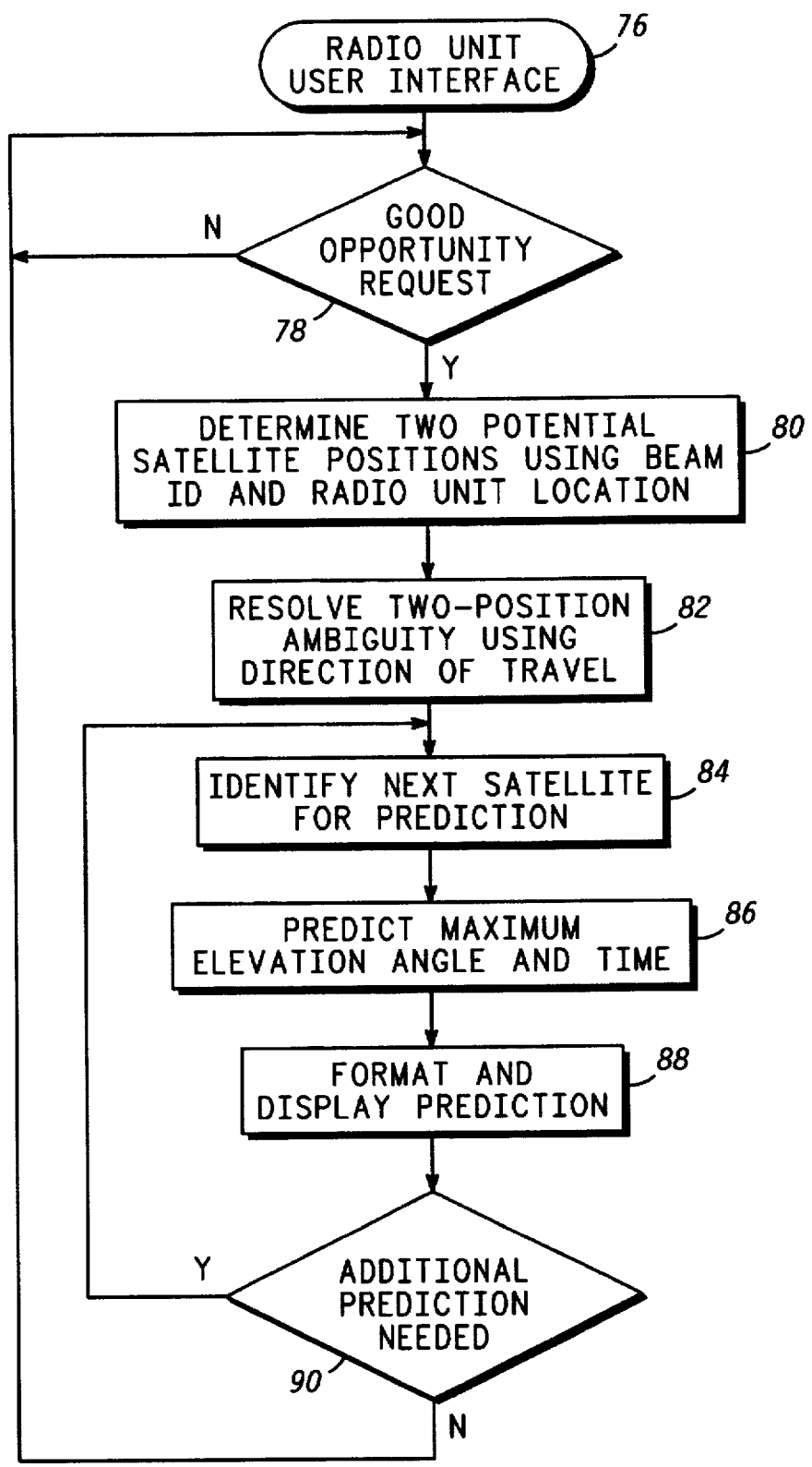
FIG. 9 shows a flow chart of a radio unit user interface process performed by the radio unit.

FIG. 7 shows a block diagram of hardware included in a radio unit 26, and FIGS. 8 and 9 show flow charts processes performed by a radio unit 26. Desirably, any number of radio units 26 may include substantially the same hardware and perform substantially the same processes.

Referring to FIG. 7, an antenna 56 couples to an RF input of a receiver 58. A controller 60 couples to receiver 58, a display 62, and a memory 64. Controller 60 may be implemented using one or more microprocessors or other programmable components. Memory 64 stores instruction data which are executed by controller 60 to perform the processes illustrated in FIGS. 8 and 9. In addition, memory 64 stores other variables, tables, databases, and the like, which controller 60 uses in performing these processes. Display 62 presents data supplied to it by controller 60 to a user of radio unit 26. Controller 60, under the influence of the processes which are discussed below in connection with FIGS. 8 and 9, obtains data conveyed by a broadcast beam signal, predicts future times when communications with satellites 12 are more likely to be successful, and causes display 62 to present the future times data to a user. Although not shown, radio unit 26 may include additional components, such as a transmitter, vocoder, microphone, speaker, keypad, and the like.

Referring to FIG. 8, a radio unit idle process 66 performed by radio unit 26 includes a task 68. During task 68, radio unit 26 receives a broadcast beam signal and detects the data conveyed therein. As discussed above, a broadcast beam signal is desirably transmitted in each beam 32 (see FIG. 2) of each satellite 12. The particular broadcast beam signal received at task 68 corresponds to the particular cell 34 within which radio unit 26 is located.

After task 68, a task 70 identifies and saves a direction of travel for the satellite 12 transmitting the signal received in task 68. Task 70 resolves the direction of travel as being one of either a north-south direction or a south-north direction. This determination may be accomplished by comparing the position data obtained from the signal just received in task 68 with like position data received in an earlier iteration of task 68.

Next, a task 72 saves the satellite ID, beam ID, and geographic position data along with the direction of travel data in memory 64 (see FIG. 7). After task 72, an optional task 74 geolocates radio unit 26 by combining data from the most current broadcast beam signal received in task 68 with previous signals from the same and possibly other satellites.

Task 74 is optional because the geographic position data received in task 68 and saved in task 72 already provide a crude indication of the radio unit's location. The radio unit is located somewhere near the indicated position. This crude indication of position is typically adequate for purposes of the present invention. However, radio unit 26 may more precisely determine its own position for purposes which may or may not be related to the present invention. This more precisely determined position can be used by radio unit 26 for the purposes of the present invention and a more accurate result may be achieved.

After task 74, process 66 may perform other tasks, as indicated by ellipsis. Eventually, program control loops back to task 68 to track the broadcast beam signals over time. Moreover, process 66 continues to operate in a programming loop so that the most current data received from a broadcast beam signal will be available in memory 64 (see FIG. 7).

Those skilled in the art will appreciate that continually operating process 66 in a loop does not prevent other processes from being performed simultaneously with process 66. In fact, a radio unit user interface process 76 illustrated in FIG. 9 operates concurrently with process 66.

Referring to FIG. 9, process 76 is performed to respond to a user interface of radio unit 26. The user interface may include a keypad (not shown), and process 76 is performed to respond to keypad manipulation. In particular, a query task 78 determines whether a "good opportunity" request has been received from the user interface. A good opportunity request represents an inquiry from a user about when a good opportunity will occur for the system to be available. The good opportunity request may be detected when a user presses a particular key or sequence of keys on a keypad. However, if no request is detected, process 76 may perform any number of additional tasks, as indicated by ellipsis, and then loop back to task 78 to again investigate whether the user has made a good opportunity request.

When the user makes a good opportunity request, a task 80 determines two potential positions for the satellite 12 transmitting the most recently received broadcast beam signal. This satellite represents an initial satellite because it is the satellite upon which predictions are based. The two positions for the satellite are calculated using the most recent location for the radio unit 26 determined by process 66 (see FIG. 8), the beam or cell ID and network constant values stored in memory 64 (see FIG. 7). These constant values define distances and angles to a satellite from points in various cells 34 of a footprint 28 (see FIG. 2). Thus, the position calculated for satellite 12 is determined relative to the position assumed for radio unit 26.

Task 80 determines two possible positions because a satellite can be in either of two remotely located positions relative to a radio unit 26 in a given cell 34. In other words, the cell 34 may be at two remote positions relative to the satellite depending upon the direction of travel for the satellite. Thus, after task 80, or simultaneously with task 80 (not shown), a task 82 resolves the two-position ambiguity by using the direction of travel identified in task 70 of process 66 (see FIG. 8). At this point in process 76, radio unit 26 has determined the position of the initial satellite 12 relative to radio unit 26.

After task 82, a programming loop including tasks 84, 86, 88, and 90 is performed. Task 84 identifies a next target satellite about which to make a prediction, and task 86 predicts a maximum elevation angle and future time when the maximum elevation angle will be reached. A target satellite is a satellite for which a prediction is made. The prediction is made based upon the position determined above for the initial satellite. The initial satellite may be the first target satellite for which a prediction is made.

Predictions are based upon the current time, the position of the initial satellite, and constellation constants for network 10 which are stored in memory 64 (see FIG. 7). Satellites 12 in a common plane 14 (see FIG. 1) maintain a relatively constant spacing between one another, distance above the earth, and speed. In addition, planes 14 move east to west at a relatively constant speed. Satellite ID data is desirably coded to identify the orbital plane 14 that the satellite 12 occupies, and by identifying this plane 14, radio unit 26 determines whether seam 16 (see FIG. 1) needs to be factored into its predictions.

Given the position of an initial satellite 12 in a known orbital plane 14, task 86 calculates the position of the current target satellites 12 along with the future time at which the target satellites 12 will be at a maximum elevation angle relative to radio unit 12. Desirably, the maximum elevation angle calculated in task 86 occurs when a satellite track 14' crosses imaginary line 36 (see FIGS. 3-4). These calculations are performed in accordance with well known orbital geometry.

After task 86, a task 88 formats the future time and maximum elevation angle calculated above in task 86 for presentation at display 62 (see FIG. 7). In one embodiment, the calculated time of day and elevation angle are presented at display 62. However, other embodiments may present displacement from current time, omit elevation angle data, or interpret elevation angle data with respect to a likelihood of having a good opportunity to engage in communication. As discussed above, this likelihood increases as the maximum elevation angle achieved by satellites traveling overhead increases.

In a preferred embodiment of the present invention, the future time calculated above in task 86 is stored in the radio unit and an audible alert is sounded at that time to alert a user that a good opportunity for communication exists. This way, the user does not have to remember the information displayed in task 86.

After task 88, a query task 90 determines whether additional predictions are needed. If additional predictions are needed, program control loops back to task 84 to identify a next target satellite for which to make a prediction. This next target satellite is desirably the next satellite to appear over the horizon from where radio unit 26 is located. Task 90 may make its determination based upon a request from a user to supply additional predictions. Alternatively, task 90 may automatically cause a predetermined number of predictions to be made, or may automatically cause process 76 to make additional predictions until a satellite is predicted which has an elevation angle directly overhead.

When task 90 eventually determines that no additional predictions are needed, process 76 may perform additional tasks, as indicated by ellipsis, and then loop back to task 78 to investigate whether another good opportunity request has been made.

In summary, the present invention provides an improved method and apparatus for predicting conditions under which a mobile radio unit will have a good chance of engaging in successful communications. Information is provided to a user of a mobile radio unit to allow the user to deal with blocked signal problems. The user is informed of conditions under which successful communications are more likely in a communication system using space-based satellite base stations and earth-bound mobile radio units.

The present invention has been described above with reference to preferred embodiments. However, those skilled in the art will recognize that changes and modifications may be made in these preferred embodiments without departing from the scope of the present invention. For example, the sequencing and nature of the various tasks described herein may be altered significantly while still accomplishing equivalent results. Moreover, the nature of the data which are presented to a user may be formatted and presented in a wide variety of equivalent examples. These and other changes and modifications which are obvious to those skilled in the art are intended to be included within the scope of the present invention.

What is claimed is:

1. A method for operating a radio unit that communicates with a constellation of satellites traveling in orbital planes around the earth, each of said satellites of said constellation projecting a plurality of antenna beams, said method comprising the steps of:

receiving a signal transmitted from one of said satellites, said signal including antenna beam information uniquely identifying one of said antenna beams;

determining a relative position between said radio unit and said satellite based on said antenna beam information;

predicting, using said relative position and system configuration data, a future time when one of said satellites shall be at an approximate maximum elevation angle relative to said radio unit, said future time being when successful communication between said radio unit and said one of said satellites may take place; and presenting said future time to a user of said radio unit.

2. A method as claimed in claim 1 wherein:

the predicting step includes the step of predicting said future time based on said system configuration data, wherein said system configuration data includes antenna beam configuration information, spacing information, and rotational information.

wherein said antenna beam configuration information defines a relative position of each antenna beam of said plurality associated with each satellite, said spacing information defines a relative spacing between satellites within said orbital planes, and said rotational information defines a relative movement of said orbital planes, and wherein said predicting step additionally determines a parameter which characterizes the likelihood of successful communication between said radio unit and said one satellite at said future time based on a value of said maximum elevation angle, lower values having a less likelihood of successful communication associated therewith and higher values having a greater likelihood of successful communication associated therewith; and said presenting step presents said parameter to said user of said radio unit.

3. A method as claimed in claim 2 wherein:

the determining step includes the step of determining a direction of travel for said one satellite; and when said direction of travel is determined to be toward said radio unit, the predicting step includes the step of predicts a future time when said one satellite will be said maximum elevation angle, said one satellite being the same satellite from which said signal was received in the receiving step;

when said direction of travel is determined to be away from said one radio unit, the predicting step includes the step of predicting a future time when a second satellite will be at said approximate maximum elevation angle with respect to said subscriber unit.

4. A method as claimed in claim 3 wherein the determining step further comprises the step of determining a relative direction of travel of an orbital plane associated with said one satellite based on said antenna beam information received in said receiving step and said antenna beam configuration information of said system configuration data;

wherein the predicting step further includes the step of predicting said future time for said second satellite when said direction of travel of said one satellite is determined to be away from said one radio unit and said direction of travel of said orbital plane is determined to be toward said radio unit, said second satellite and said one satellite being in the same orbital plane, and said second satellite being a next satellite traveling in the same orbital plane as said one satellite;

wherein the predicting step includes the step of predicting a third satellite when said direction of travel is determined to be away from said one radio unit and said direction of travel of said orbital plane is determined to be away from said radio unit, said third satellite and said one satellite being in different orbital planes, said one satellite being in a first orbital plane, said third satellite being in a second orbital plane, said second orbital plane having a direction of travel toward said radio unit.

5. A method as claimed in claim 4 wherein:

the determining step comprises the step of determining said direction of travel of said one satellite and said orbital plane based on an antenna beam ID received in said receiving step, said antenna beam ID identifying an antenna beam currently being projected toward a geographic region in which said radio unit is located.

6. A method as claimed in claim 2 wherein said determining step comprises the step of tracking said signal over time to determine a direction of travel for said satellite.

7. A method for operating a cellular communication system in which a radio unit located near the surface of the earth communicates with a constellation of satellites traveling in moving-earth orbits, said method comprising the steps of:

transmitting identifying signals from said satellites, said identifying signals including antenna beam information uniquely identifying antenna beams projected by said satellites;

receiving one of said identifying signals at said radio unit;

determining, at said radio unit based on said antenna beam information, a relative position between said radio unit and an initial one of said satellites;

predicting, at said radio unit using said relative position and system configuration data, a future time when a target satellite shall be at an approximate maximum elevation angle relative to said radio unit, said future time being when successful communication between said radio unit and said target satellite may take place; and presenting said future time to a user of said radio unit.

8. A method as claimed in claim 7 wherein: the predicting step includes the step of predicting said future time based on said system configuration data, wherein said system configuration data includes antenna beam configuration information, spacing information, and rotational information, wherein said antenna beam configuration information defines a relative position of each antenna beam of said plurality associated with each satellite, said spacing information defines a relative spacing between satellites within said orbital planes, and said rotational information defines a relative movement of said orbital planes, and wherein said predicting step additionally determines a parameter which characterizes the likelihood of successful communication between said radio unit and said target satellite at said future time based on a value of said maximum elevation angle, lower values having a less likelihood of successful communication associated therewith and higher values having a greater likelihood of successful communication associated therewith; and said presenting step presents said parameter to said user of said radio unit.

9. A method as claimed in claim 7 wherein the determining step includes the step of determining a direction of travel for said initial satellite; and when said direction of travel is determined to be toward said radio unit, the predicting step includes the step of predicts a future time when said target satellite will be said maximum elevation angle, said target satellite being the same satellite from which said signal was received in the receiving step;

when said direction of travel is determined to be away from said one radio unit, the predicting step includes the step of predicting a future time when said target satellite will be at said approximate maximum elevation angle with respect to said subscriber unit, said target satellite being a different satellite from which said signal was received in the receiving step.

10. A method as claimed in claim 7 wherein:

wherein the determining step further comprises the step of determining a relative direction of travel of an orbital plane associated with said initial satellite based on said antenna beam information received in said receiving step and said antenna beam configuration information of said system configuration data;

wherein the predicting step further includes the step of predicting said future time for said target satellite when said direction of travel of said initial satellite is determined to be away from said one radio unit and said direction of travel of said orbital plane is determined to be toward said radio unit, said target satellite and said initial satellite being in the same orbital plane, and said target satellite being a next satellite traveling in the same orbital plane as said initial satellite;

wherein the predicting step further includes the step of predicting a third satellite when said direction of travel is determined to be away from said one radio unit and said direction of travel of said orbital plane is determined to be away from said radio unit, said third satellite and said initial satellite being in different orbital planes, said initial satellite being in a first orbital plane, said third satellite being in a second orbital plane, said second orbital plane having a direction of travel toward said radio unit.

11. A method as claimed in claim 7 wherein:

the determining step further comprises the step of determining said direction of travel of said initial satellite and said orbital plane based on an antenna beam ID received in said receiving step, said antenna beam ID identifying an antenna beam currently being projected toward a geographic region in which said radio unit is located.

12. A method as claimed in claim 10 wherein said determining step comprises the step of tracking, at said radio unit, said identifying signal over time to determine a direction of travel for said initial satellite.

13. A radio unit that communicates with a constellation of satellites traveling in moving-earth orbits, each of said satellite of said constellation projecting a plurality of antenna beams toward earth's surface, said radio unit comprising:

a receiver for receiving a signal transmitted from one of said satellites, said signal including antenna beam information uniquely identifying one of said antenna beams;

a controller coupled to said receiver, said controller being configured to determine a relative position between said radio unit and said satellite in response to said signal based on said antenna beam information, said controller further configured to predict, using to said relative position and system configuration data, a future time when one of said satellites shall be at an approximate maximum elevation angle relative to said radio unit, said future time being when successful communication between said radio unit and one of said satellites may take place; and a display, coupled to said controller, for presenting said future time to a user of said radio unit.

14. A radio unit as claimed in claim 13 wherein said controller is further configured to predict said future time based on said system configuration data, wherein said system configuration data includes antenna beam configuration information, spacing information, and rotational information, wherein said antenna beam configuration information defines a relative position of each antenna beam of said plurality associated with each satellite, said spacing information defines a relative spacing between satellites within said orbital planes, and said rotational information defines a relative movement of said orbital planes, and wherein said controller is further configured to define a parameter which characterizes the likelihood of successful communication between said radio unit and said one satellite at said future time based on a value of said maximum elevation angle, lower values having a less likelihood of successful communication associated therewith and higher values having a greater likelihood of successful communication associated therewith, and said display is further configured to display said parameter.

15. A radio unit as claimed in claim 13 wherein said controller is further configured to track said signal over time and to determine a direction of travel for said satellite.

16. A radio unit as claimed in claim 13 wherein said receiver is configured to detect data from said signal which describe a geographic position.

* * * * *